Aug. 8, 1939.  L. R. BUCKENDALE  2,168,970
AUTOMOTIVE MULTIWHEEL VEHICLE
Filed Nov. 23, 1936  4 Sheets-Sheet 2

Inventor
Lawrence R. Buckendale

By Strauch & Hoffman
Attorneys

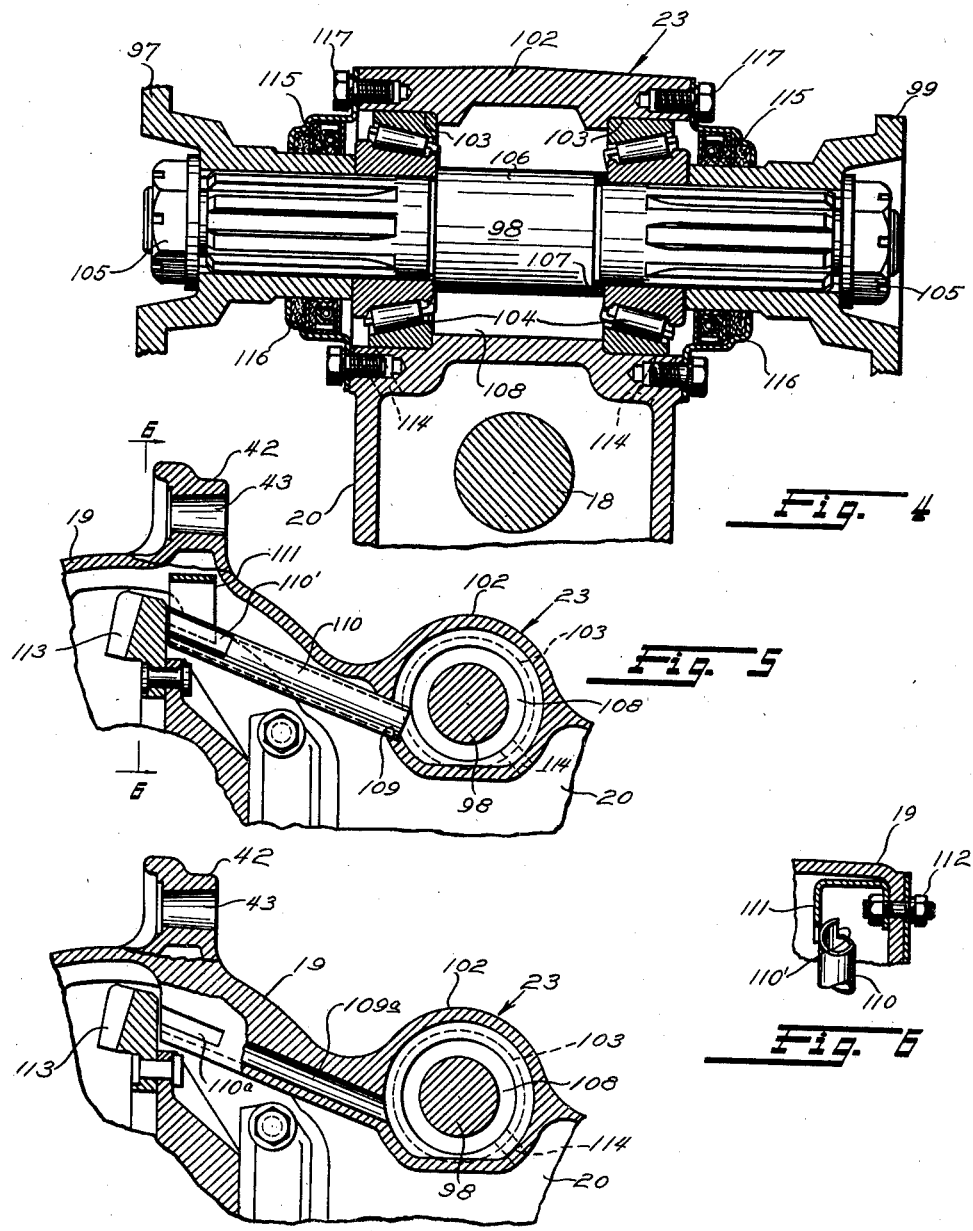

Aug. 8, 1939.                L. R. BUCKENDALE                2,168,970
                        AUTOMOTIVE MULTIWHEEL VEHICLE
                          Filed Nov. 23, 1936          4 Sheets-Sheet 4
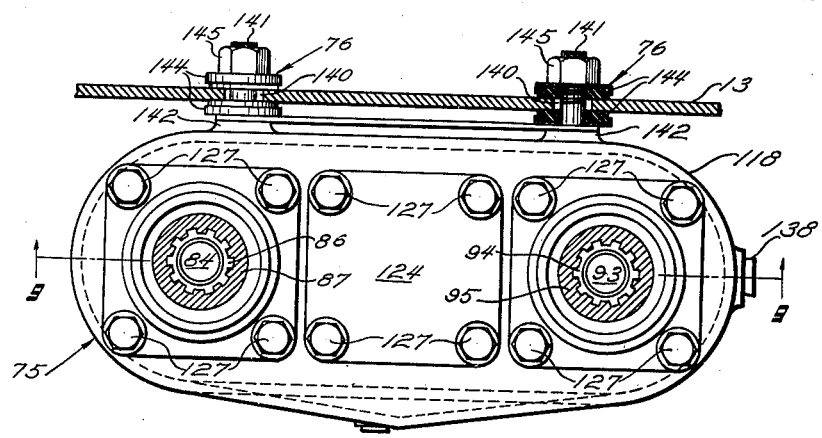
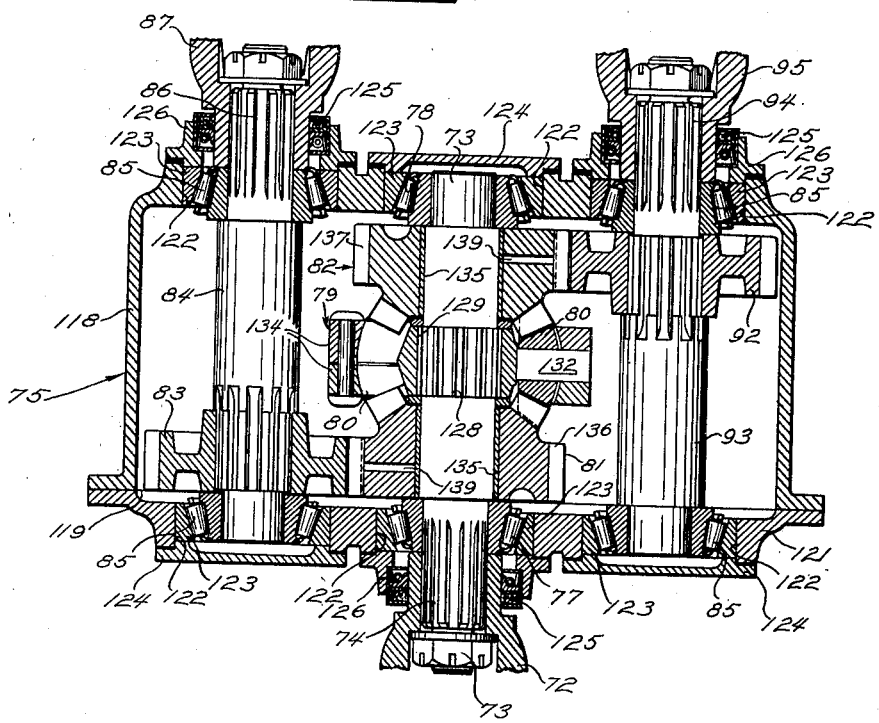
Inventor
Lawrence R. Buckendale
By  Strauch & Hoffman
           Attorneys Patented Aug. 8, 1939

2,168,970

UNITED STATES PATENT OFFICE 2,168,970

AUTOMOTIVE MULTIWHEEL VEHICLE

Lawrence R. Buckendale, Detroit, Mich., assignor to The Timken-Detroit Axle Company, Detroit, Mich., a corporation of Ohio Application November 23, 1936, Serial No. 112,413

3 Claims. (Cl. 180—22)

The present invention relates primarily to a novel drive arrangement for use with a multi-wheel tandem axle vehicle. More particularly, the present invention relates to a drive arrangement for use with a vehicle having dual sets of driven wheels.

It is a primary object of the present invention to provide multi-wheel drive arrangements and spring suspensions which are extremely rugged and satisfactory and require a minimum of labor in servicing.

A further object of the present invention is to provide a novel and improved dual axle drive unit of the type having a separate propeller shaft from the power source to each axle and including novel means for mounting the axles on the vehicle framework for independent movement and tilted to cooperate with said separate propeller shafts.

A still further object of the present invention resides in providing a spring suspension for a multi-wheel tandem axle vehicle wherein the springs are journaled on trunnions in the form of stub shafts carried by depending frame portions, with a novel cross-bracing member connecting the depending frame portions below the plane of said axles.

Another object of the present invention resides in the provision of a novel drive arrangement for use with a multi-wheel tandem axle vehicle including a power divider having a centrally disposed input shaft and a pair of symmetrically disposed parallel take-off shafts driven from a differential carried by the input shaft.

Further objects of the present invention will appear as the description thereof proceeds in connection with the appended claims and accompanying drawings, wherein:

Figure 1A is a side elevational view of the power divider and its supporting plate as seen when looking upon the plane of line 1A—1A in Figure 1.

Figure 4 is a transverse sectional view through the novel propeller shaft journal provided on the forward drive axle.

Figure 5 is a longitudinal, fragmental sectional view through the forward drive axle showing the novel lubricating system provided for lubricating the journal bearings of Figure 4.

Figure 6 is a fragmental sectional view taken on line 6—6 of Figure 5 showing the bracket for positioning the lubricant supply tube of Figure 5 and the manner in which it is connected to the housing of the forward drive axle.

Figure 7 is a sectional view of a modified form of lubricant supply system for the propeller shaft journal.

Figure 8 is an end view looking toward the rear end of the power divider shown in Figure 1, and Figure 9 is a transverse, sectional view taken on the plane of line 9—9 of Figure 8 when viewed in the direction of the arrows.

Figure 1:
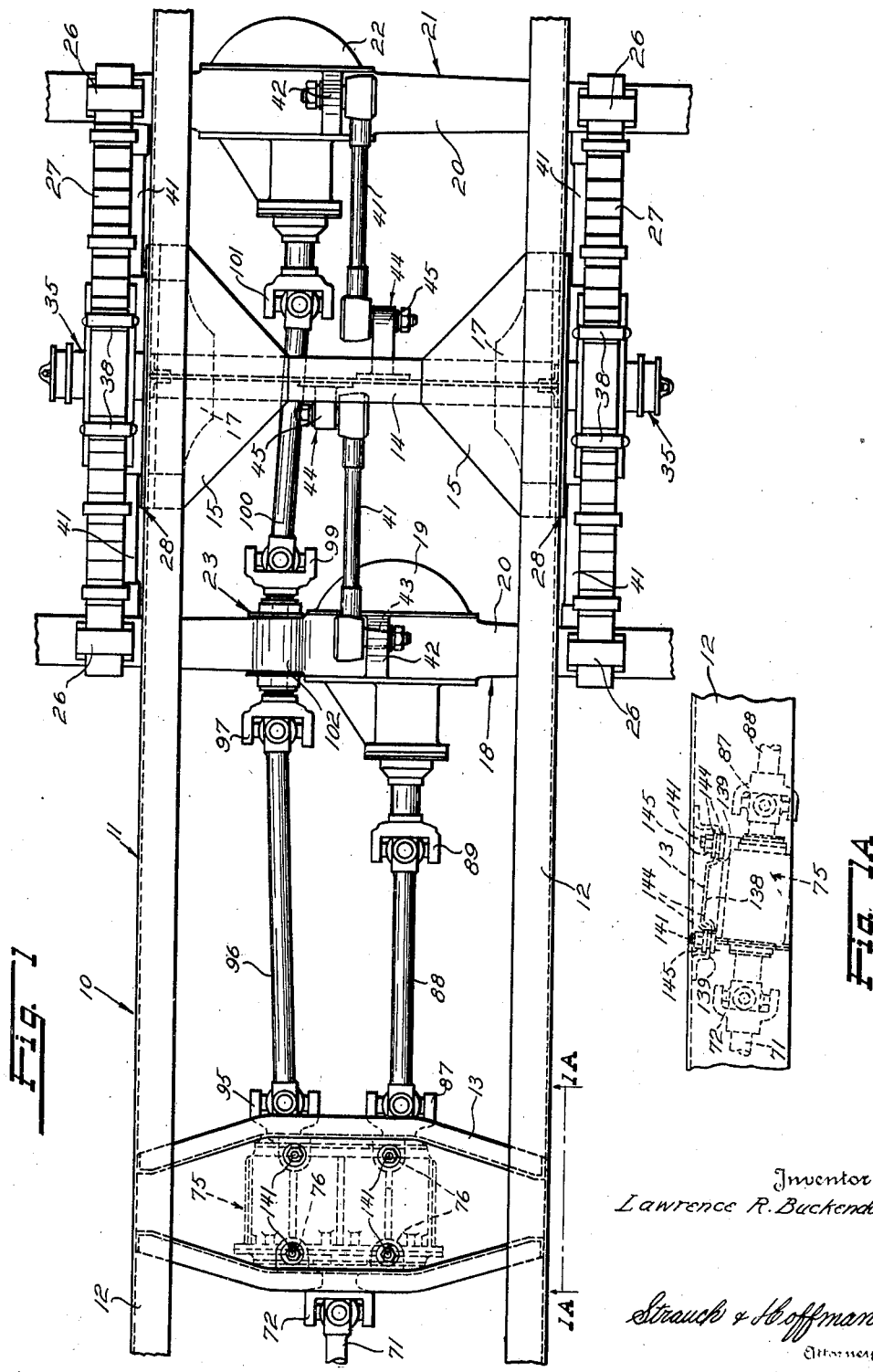
Figure 1 is a fragmentary plan view of a multi-wheel drive vehicle including the novel power divider, propeller shaft journal structure and lubricant supply systems of the present invention.

With continued reference to the drawings, wherein like numerals are utilized throughout the several figures to indicate the same parts, numeral 10 indicates generally a multi-wheel vehicle structure embodying the novel features of the present invention.

Multi-wheel vehicle structure 10 includes a frame 11 comprising spaced longitudinal U-beams 12 running from end to end of the vehicle. Frame members 12 may be connected by conventional cross members in the usual manner, such members not being shown in the present drawings. A suitable cross plate 13 is shown at the forward end of frame 11, Figure 1, and Figure 1A, for taking the place of one of the conventional cross members, but primarily for a purpose that will be hereinafter pointed out.

Figure 3:
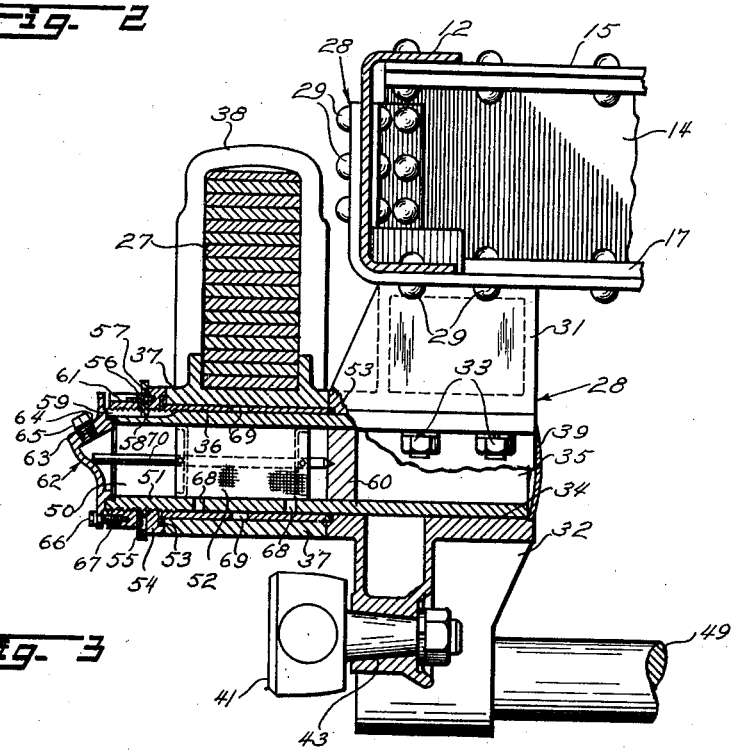
Figure 3 is a fragmental transverse sectional view showing the novel lubrication system of the present invention employed for supplying lubricant to the pivotal spring seats.

Adjacent the rear end of frame 11 a transverse I-beam 14 is secured in place between longitudinal members 12 by means of plates 15 and 17 which are preferably riveted to members 12 and to I-beam 14 (see also Fig. 3). The purpose of this I-beam in addition to its incidental reinforcing of frame 11 will be pointed out as the description proceeds.

Frame member 11 is supported on suitable dirigible wheels (not shown) at its extreme forward end. The opposite end is supported by a forward drive axle 18 comprising a differential housing 19 and an axle housing 20, and by a rear drive axle 21 including a differential housing 22 and an axle housing 20. Forward axle housing 20 is provided with a journal 23 the purpose of which will be hereinafter pointed out. Suitable drive wheels 24 support the ends of axles 18 and 21. Axle housings 20 adjacent their ends are provided with suitable spring seats 26; and suitable springs, such as leaf springs 27, are adapted to rest in said spring seats 26.

Springs 27 are journaled at their mid-points to frame members 12 by means of assemblies including brackets 28 connected to frame members 12 by means of rivets 29. Each bracket 28 is made up of an upper member 31 and a lower member 32. Suitable bolt assemblies 33 connect members 31 and 32 as seen in Figures 2 and 3. Members 31 and 32 of each set cooperate when joined to provide a cylindrical socket 34 therebetween for reception of a hollow stub shaft 35. The stub shafts 35, as clearly shown in Figures 1 and 3 extend outwardly from frame members 12 and are provided with bearings in the form of sleeves 36. Spring seats 37, having leaf springs 27 secured thereto by means of the usual U-bolts 38 surround bearings 36 and abut the outer faces of brackets 28. The inner ends of the hollow stub shafts are closed by disks 39.

Means are provided for maintaining the axles 18 and 21 in definite spaced relation since the springs 27 merely rest upon axle seats 26 and are not connected thereto. To this end, suitable radius rods 41 are provided. Radius rods 41 are of equal length and identical construction.

Figure 2:
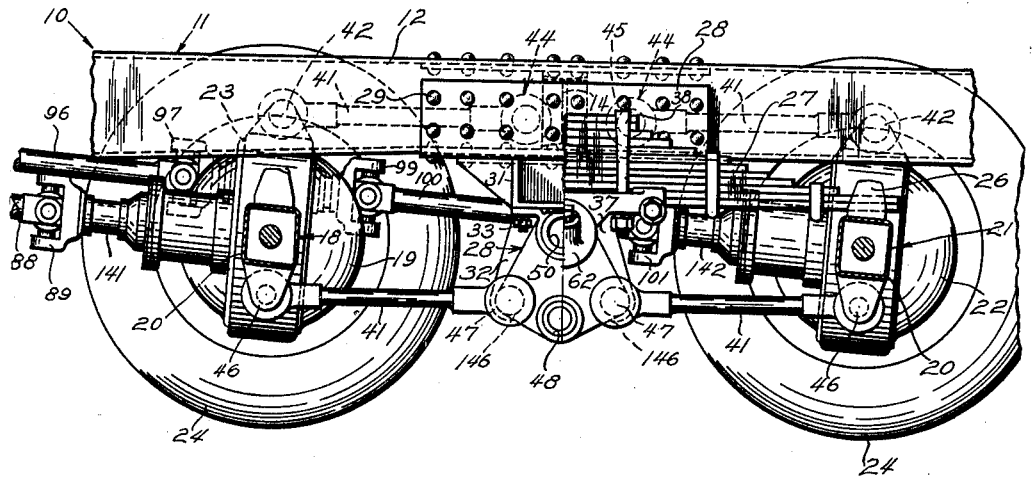
Figure 2 is a fragmental side elevational view of the multi-wheel unit disclosed in Figure 1.

Referring to Figures 1, 2 and 3, a pair of rods 41 are centrally disposed and pivotally connected at one end to the top of axles 18 and 21 through lugs 42 integrally formed on axle housings 20. The connections at 42 are preferably formed by means of tapered pivot pins 43 that are secured to the lugs and that project into enlargements or sockets on the ends of radius rods 41. The opposite ends of these rods 41 are similarly pivoted at 44 to I-beam 14 which is provided with suitable brackets 45, the rear one being slightly longer than the forward one. The bottom ends of axles 18 and 21 are pivotally connected at 46 to further rods 41, serving as torque rods, the opposite ends of which are pivotally connected at 47 to the lower bracket members 32. As shown in Figure 2, connections 47 are symmetrically disposed with respect to the vertical center line of members 32 and an aperture 48 provided in each of said members. A transverse cross rod 49 disposed in apertures 48 interconnects members 32 in order to brace the same and prevent lateral movement thereof. The connections 42, 44, 46 and 47 are designed so that no lubrication is required. To this end rubber preferably is utilized in the connections.

In order to insure proper lubrication of the spring journals provided by shafts 35, apertures 34 and bearings 36, the present invention provides oil reservoirs 50 within the hollow outer ends 51 of the stub shafts 35. In order to control the lubrication of the journals and bearings 36, the oil reservoirs 50 are provided with oil cartridges 52 which are made up of cylindrical screens filled with a suitable absorbent material, such as cotton waste. Seals 53 are positioned at the opposite ends of bearings 36.

The seals 53 and bearings 36 are positioned by means of adjusting nuts 54 which are threaded on the outer ends of shafts 35. Lock rings 55, having apertures 56 therein are slid upon the ends of shafts 35. Apertures 56 of rings 55 receive pins 57 secured in adjusting nuts 54. Suitable lugs 58 on lock rings 55 seat in keyways 59 in shafts 35 and prevent rotation of lock rings 55. Pins 57 in apertures 56 retain adjusting nuts 54 against rotational movement. In order to securely fasten the above described members in assembled relationship, jam nuts 61 are threaded upon the ends of shafts 35 into abutting relation with lock rings 55. Jam nuts 61 are tightened so as to jam lock rings 55 against adjusting nuts 54 and thus secure the several elements in permanent position on shafts 35. Suitable closure caps 62 are positioned on the ends of shafts 35 and are provided with outwardly flared portions 63 provided with oil filler holes 64 through which a suitable lubricant is supplied for filling reservoirs 50. Plugs 65 serve to close filler holes 64 against entrance of foreign matter and escape of lubricant. Closure caps 62 are secured in position by suitable bolt assemblies 66 threaded into suitable tapped apertures 67 in jam nuts 61. The inner end of each reservoir 50 is formed by a wooden disc 60 or the like, which snugly fits the bore of the stub shaft at a point intermediate the ends of the latter.

The stub shafts have oil passages 68 connecting oil reservoirs 50 with the inner peripheries of bearing members 36, and in order to ensure the presence of lubricant between bearings 36 and spring seats 37, the bearings 36 are provided with oil passages 69. Each oil cartridge 52 is pierced by an axial positioning pin 70, one end of which may be driven into the wooden disc 60 and the other end of which engages the closure cap 62, the cartridge thus being mounted to effectively and slowly distribute oil to the ports 68.

Since rubber connections are used at 42, 44, 46 and 47, the spring journals are the only points requiring lubrication, and these points are lubricated by the novel reservoir and cartridge construction which requires infrequent attention.

The axles of the multi-wheel unit described above are supplied with power from a suitable change speed transmission, not shown. The drive from the change speed transmission is through a main propeller shaft 71 including a universal joint 72. From universal joint 72 the power from propeller shaft 71 (see also Figure 9) is transmitted to a power divider input shaft 73 which is splined at 74 to the universal joint 72. Shaft 73 is journaled centrally of a power divider casing assembly 75, which is secured to frame 12 by means of suitable connections 76, to be hereinafter described in detail. Shaft 73 is provided with suitable spaced bearings 77 and 78 which are carried by the casing assembly 75, and a differential 79 is connected to shaft 73 between these bearings 77 and 78. The differential 79 includes the usual pinions 80, and a pair of side gears 81 and 82 that may rotate differentially on the shaft 73.

Side gear 81 supplies power to a gear 83 that is splined on a forward axle take-off shaft 84. Suitable spaced bearings 85 rotatably support shaft 84 in the casing assembly 75. The protruding end of shaft 84 is provided with splines 86 which are suitably connected to a universal joint 87 adapted to connect the shaft 84 to a propeller shaft 88 that extends to the front for connection with the mechanism of the differential housing 19 by way of a universal joint 89. Universal joints 87 and 89 permit angular displacement of propeller shaft 88 with respect to shaft 84 and the front axle differential during normal operation of the vehicle, in well-known manner.

Differential side gear 82 transmits power to a gear 92 and thence to a rear axle take-off shaft 93 supported by spaced bearings 85. The protruding end of shaft 93 is provided with splines 94 which receive universal joint 95 adapted to connect shaft 93 to rear axle propeller shaft 96. A universal joint 97 connects shaft 96 to journal shaft 98 mounted in journal 23 provided on forward axle housing 20. Shaft 98 to the rear of journal 23 is provided with a universal joint 99 connecting shaft 98 and a short rear axle propeller shaft 100. A universal joint 101 connects shaft 100 to the differential in rear axle differential housing 22.

From the foregoing description it will be clear that the drive for axles 18 and 21 is transmitted from the change speed transmission to propeller shaft 71, through the power divider differential 79, and then to propeller shafts 88 and 96 driving them at differential speeds in well-known manner. Shafts 88 and 96 transmit power to the usual axle differentials in axles 18 and 21, respectively. In view of this construction the axle differentials may be driven at differential speeds and the wheels 22 of the respective axles due to the axle differentials may also be driven at differential speeds.

The journal 23 and its associated mechanism, provided on forward axle 18, constitute a very important part of the present invention. The journal includes a boss 102 integrally formed on axle housing 20 and provided with spaced bearing seats 103 which preferably receive tapered roller bearings 104 (see Figures 4-6). Bearings 104 rotatably support shaft 98 in journal 23 and serve to take the radial load as well as the axial thrust imparted to shaft 98 during normal operation of the vehicle. Nuts 105 threaded on the ends of shaft 98 clamp the inner bearing races of bearings 104 between the shoulders provided by enlarged portion 106 of shaft 98 and the yokes of universal joints 97 and 99. Suitable shims 107 are provided for maintaining bearings 104 in spaced relation so that their outer races are properly positioned on seats 103.

A novel lubrication system is provided for the bearings 104. To this end the boss 102, between bearing seats 103, is disposed lower than the top of the axle differential and is of sufficient diameter to provide a relatively large oil reservoir 108 between shaft 98 and the interior of boss 102. A hole 109 is provided between reservoir 108 and the interior of differential housing 19. An inclined oil tube 110 is positioned with its lower end in the hole 109 and its upper end at a high point in the differential housing 19 adjacent the top of the ring gear of the latter. The upper end of tube 110 is cut away to provide an open channel 110' for reception of lubricant. A suitable U-shaped bracket 111 adjustably secured within housing 19 by means of a nut and bolt assembly 112 (Figure 6) is preferably welded to the tube 110 adjacent cut-away portion 110'.

Differential housing 19 is supplied with lubricant to a sufficient depth to insure the dipping of differential bevel gear 113 therein. As a consequence gear 113 carries a film of the lubricant on its surface as it rotates, and since the channel 110' faces in a direction generally opposite to that of rotation of the adjacent gear portion the lubricant on the plain back face of gear 113, due to the rotation is thrown into and/or picked off by the cut-away portion 110' of oil tube 110. Oil, thus deposited in tube 110, flows by gravity to oil reservoir 108 and thence to bearings 106 to properly lubricate them. The excess oil transmitted to oil reservoir 108 is returned to differential housing 19 through return ports 114 provided in the lower surface of reservoir 108 adjacent the outer ends of the bearings. To prevent the escape of lubricant into the atmosphere from bearings 106 suitable oil seals 115 are provided which surround the adjacent yokes of universal joints 97 and 99. Suitable covers 116 secured to boss 102 by cap screws 117 retain oil seals 115 in position. From the above description it will be seen that no external lubricant fitting need be provided for journal 23 or bearings 104.

If desired, the tube 110 may be eliminated and a passage 109a formed directly in housing 19, as shown in Figure 7. From this structure, it will be clear that opening 110a in passage 109a receives the lubricant thrown by gear 113 and conveys it to reservoir 108.

The novel propeller shaft journal structure and lubricating means therefor, just described, forms the subject matter of a divisional application filed on February 10, 1939 and bearing Serial No. 255,773.

The power divider briefly described heretofore is constructed as follows. The casing assembly includes a main casing 118 for housing shafts 73, 84 and 93, differential 79 and gears 81 and 82. Casing 118 has an opening 119 closed by a removable face plate 121, the face plate 121 and casing 118 being provided with aligned openings 122 which are designed to receive bearings 77, 78 and 85. In the preferred construction, the bearing races 123 of bearings 77, 78 and 85 are press fitted into openings 122. Suitable caps 124 are provided for closing those bearing apertures 122 that are at the front of the power divider shafts 84 and 93, and at the rear of input shaft 73. Oil seals 125 held in place by means of retainers 126 are disposed adjacent those apertures 122 through which shafts 73, 84 and 93 extend. Caps 124 and retainers 126 are secured to casing 118 by cap screws 127 or any other suitable means.

Although the power divider may take any desired form, such as for example, that shown in Fageol Patent Number 1,933,667 issued November 7, 1933. The preferred specific arrangement, however, for this particular drive lay-out is as shown in the drawings, wherein shaft 73 is centrally disposed with respect to the longitudinal axis of vehicle frame 11 and shafts 84 and 93 are symmetrically disposed on either side of shaft 73 and in a common horizontal plane. The shaft 73, midway between bearings 77 and 78 is provided with raised splines 128, which are designed to receive an internally splined spider 129. The spider is provided with several radially extending arms 132 which rotatably support the differential pinions 80. The outer ends of the arms 132 are received between mating ring sections 134 which serve as a differential case to retain the bevel pinions 80 in assembled relation on arms 132. The differential gears 81 and 82 are rotatably supported on shaft 73 by means of bearings 135 and are designed to mesh laterally with pinions 80. Gears 81 and 82 are provided with integrally formed peripheral teeth 136 and 137 which mesh with the front axle take-off gear 83 and the rear axle take-off gear 92, respectively. Teeth 136 and 137, and those of gears 83 and 92 are preferably of the helical type in order to obtain quiet operation of the power divider.

Housing 118 is provided with lubricant through a fitting 138 (Figure 8) to sufficient depth to insure the dipping of gears 81, 82, 83, 92, 136 and 137 therein. In order that lubricant may reach bearings 135 suitable radial passages 139 are provided in the respective gears.

Should it be desired at times to drive only one axle of the multi-wheel unit, the power divider of the present invention may be constructed so that either gear 83 or 92 may be shifted along the splines on shaft 84 or 92 to disengage gears 136 and 137. At the same time the associated differential gear would have to be locked against rotation. As a result one of the drive axles would be driven from main propeller shaft 71 due to the rotation of pinions 133.

As previously pointed out, the power divider is mounted on cross frame member 13. To this end frame member 13 is provided with an inclined portion 138 which slopes toward the rear of frame-work 11. Depressions 139 are provided in portion 138 and are suitably apertured at 140 to receive the power divider securing members in the form of studs 141 secured in bosses 142 provided in the upper surface of casing 118. Studs 141 extend upwardly from casing 118 and are adapted to be loosely received in apertures 140 provided in plate 13. Apertures 140 as clearly shown in Figure 8 are of much greater diameter than studs 141, and suitable washers, in the present embodiment rubber washers 144, are disposed on either side of plate 13 and nuts 145 are threaded on studs 141 securely clamping plate 13 between washers 144. This novel structure provides a resilient, sound and shock absorbing connection between the power divider and frame 11 of the vehicle.

As clearly seen in Figure 2 of the drawings, axles 18 and 21 are tilted backward so that their front faces are in approximate parallelism, and in parallelism with the rear face of power divider 75 (see Figure 1A) and the power shafts 141 and 142 of the axle differentials are pointed toward shafts 84 and 93, respectively, with their axes in alignment. This degree of tilt is obtained by use of the proper length radius rods 41 and by properly locating the pivots for the ends of said rods.

Pivots 47, as seen in Figure 2, are forwardly offset with respect to connections 44 and compactly arranged with respect to apertures 48 and the ends of cross rod 49. This structure provides a compact arrangement of pivots 47 and cross rod 49. Pivots 44 are rearwardly offset with respect to pivots 47 to permit the desired axle tilt using equal length rods 41. Due to the fact all of the rods 41 are of equal length, there is no possibility of tilting the axles in an incorrect manner.

The operation of the disclosed embodiment is believed to be obvious in view of the above description and explanation. It will be seen that the invention comprises a dual rear axle drive unit of the type having a separate propeller shaft for each axle, wherein the several parts are compactly arranged, ruggedly constructed, effectively mounted and lubricated, and wherein the necessity of frequent lubrication and attention to prevent damage is obviated.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a dual drive axle assembly of the type wherein the axles are individually driven by separate propeller shafts, a frame-work, a pair of spaced drive axles including independent driving shafts, a pair of inclined independent propeller shafts for transmitting power to said driving shaft, a pair of equal length radius rods interconnecting the tops of said axles and said frame-work, the points of connection of said rods to said frame-work being in the same horizontal plane but spaced at unequal longitudinal distances from the mid-point between said axles, a pair of equal length rods at each end of said axles connecting the undersides of said axles to said frame-work at points equi-distant from said mid-point to serve as torque rods for said axles, whereby said axles are tilted to align said driving shafts and said propeller shafts, and springs pivoted intermediate their ends to said frame-work and having said ends resting upon seats provided on said axles.

2. In a dual drive axle assembly of the type wherein the axles are individually driven by separate propeller shafts, a frame-work including longitudinal frame members, a transverse frame member located between said axles and connected to said longitudinal frame member and bracket members depending from said longitudinal frame members, a pair of spaced drive axles including independent driving shafts, a pair of inclined independent propeller shafts for transmitting power to said driving shafts, a bracket secured to said transverse frame member and extending toward one of said axles for a predetermined distance, a bracket secured to said transverse frame member in the same horizontal plane as said last mentioned bracket and extending toward the other of said axles for a different predetermined distance, a pair of equal length radius rods interconnecting said last mentioned brackets and the tops of said axles for tilting said axles to align the driving shafts and propeller shafts, a pair of rods at each end of said axles connecting the undersides of said axles to said depending brackets to serve as torque rods, a transverse rod interconnecting said depending brackets and springs pivoted on said depending brackets with their ends resting on the tops of said axles.

3. The construction defined in claim 2, together with a power divider, including a pair of power take-off shafts for independently transmitting power to said propeller shafts, connected to said frame-work and tilted so that said take-off shafts are normally disposed in subtantial alignment with their associated propeller shafts and driving shafts.

LAWRENCE R. BUCKENDALE.

CERTIFICATE OF CORRECTION.

Patent No. 2,168,970. August 8, 1939.

LAWRENCE R. BUCKENDALE.

It is hereby certified that error appears in the printed specification of the above numbered patent requiring correction as follows: Page 4, second column, line 34, claim 2, for the word "member" read members; line 61, claim 3, for "subtantial" read substantial; and that the said Letters Patent should be read with this correction therein that the same may conform to the record of the case in the Patent Office.

Signed and sealed this 5th day of September, A. D. 1939.

Henry Van Arsdale, (Seal)

Acting Commissioner of Patents.